United States Patent [19]

Richardson et al.

[11] 4,081,078

[45] Mar. 28, 1978

[54] ARTICLE SORTING APPARATUS

[75] Inventors: Bruce E. Richardson; Rudy Oetliker; W. Doug Grierson, all of London, Canada

[73] Assignee: Labatt Breweries of Canada Limited, London, Canada

[21] Appl. No.: 672,453

[22] Filed: Mar. 31, 1976

[30] Foreign Application Priority Data

Apr. 16, 1975 Canada ................... 225025

[51] Int. Cl.² ............................... B07C 5/06
[52] U.S. Cl. ..................... 209/82; 198/366; 198/436; 209/73
[58] Field of Search ............ 209/73, 74, 82, 113, 209/114; 198/366, 367, 415, 436, 437, 442, 456, 461, 598, 782

[56] References Cited

U.S. PATENT DOCUMENTS

| 3,224,557 | 12/1965 | Beecher | 198/461 X |
|---|---|---|---|
| 3,323,633 | 6/1967 | Engel et al. | 198/461 X |
| 3,334,723 | 8/1967 | Reed et al. | 209/74 R X |
| 3,349,905 | 10/1967 | Crawford | 209/82 |
| 3,465,870 | 9/1969 | Paulsen | 198/456 X |
| 3,580,391 | 5/1971 | Littlefield | 209/73 |
| 3,608,713 | 9/1971 | Crosby et al. | 209/74 R |
| 3,735,867 | 5/1973 | Vanderhoof et al. | 209/82 X |
| 3,804,240 | 4/1974 | Wahlert | 209/73 |
| 3,866,739 | 2/1975 | Sikorski | 198/415 X |
| 3,992,182 | 11/1976 | Frank | 198/461 X |

Primary Examiner—Robert B. Reeves
Assistant Examiner—Fred A. Silverberg

[57] ABSTRACT

The present invention is directed to a carton sorting device which comprises a main conveyor and at least one subsidiary conveyor angled away from the main conveyor at a branching unit. The main conveyor is adapted to apply a lateral force to articles having a lateral dimension below a preselected value so as to urge such articles onto the subsidiary conveyor. Articles having a lateral dimension greater than said preselected value are not affected. In this way, a mixture of the small and large articles are divided into two streams, the main conveyor carrying a stream of larger articles and the subsidiary conveyor only a stream of smaller articles. The invention also makes provision for sorting streams of articles having differences in their longitudinal dimension.

7 Claims, 6 Drawing Figures

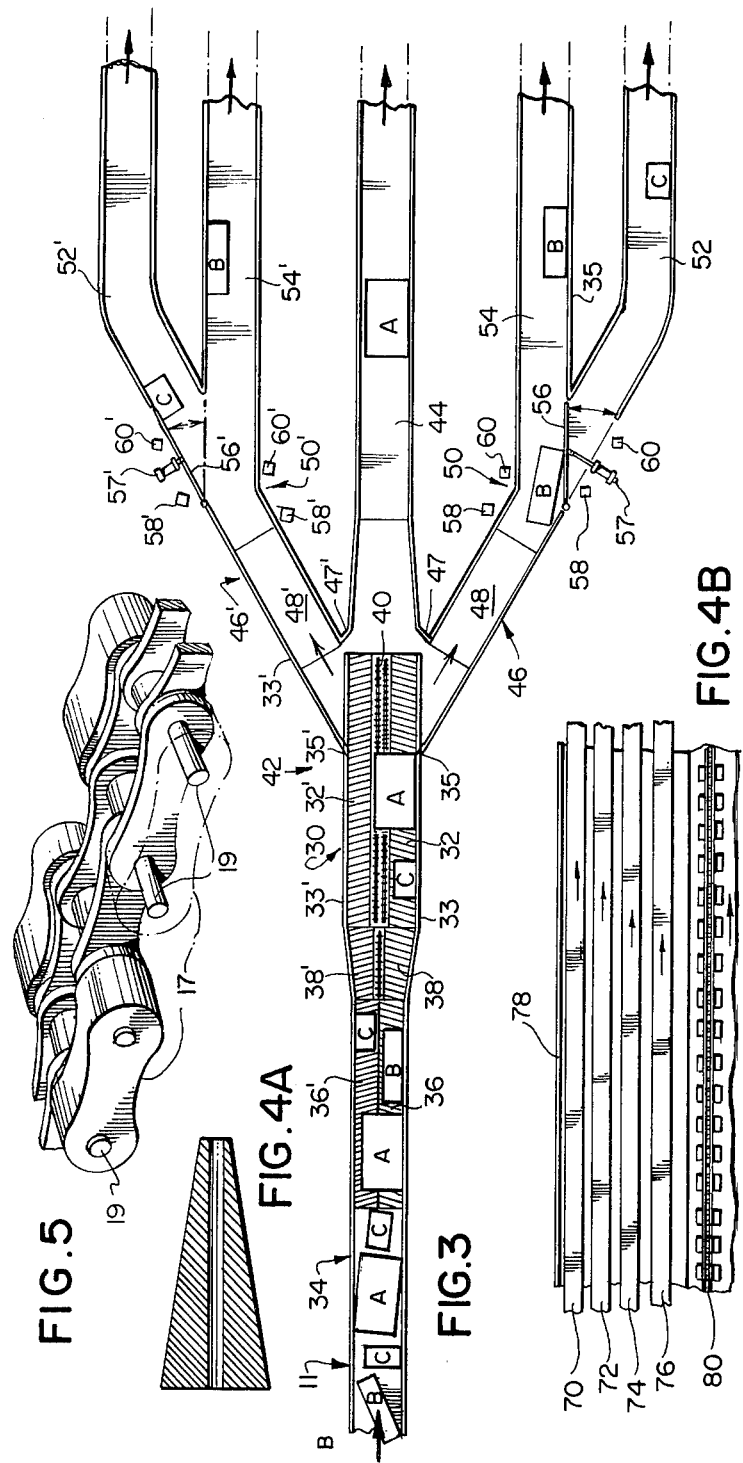

ARTICLE SORTING APPARATUS

BACKGROUND OF THE INVENTION

The present invention relates to an apparatus or device for sorting essentially rectangular articles such as cartons for bottles and in particular beer bottles.

PRIOR ART

In many parts of Canada cartons for bottles of beer are generally of three sizes, namely of 24, 12 and 6 pint bottle capacity. The 24 bottle carton is usually designated "full size"; the 12 bottle carton "half-size" and the six bottle carton "quarter size". The dimensions of these cartons are related as follows: the half-size carton has the same length as the full-size but is only half as wide; the quarter-size has half the length and is half as wide as the full-size carton and therefore whilst having the same width as the half-size carton, has only half the length; all sizes of cartons have the same height.

The beer bottles are, of course, returnable and are usually repacked when empty in the cartons which are then returned. The bottles are removed from the cartons by automatated machinery which is generally set up to handle only one size of carton at any one time. The cartons, however, are received in a random mixture of the various sizes. It is therefore necessary to sort the cartons according to size prior to their introduction to carton opening and bottle removing equipment. The cartons must be sorted rapidly and, due to the fragile nature of their contents, be handled relatively gently, i.e. vigorous handling should be avoided. For use in combination with the said specialized bottle removal equipment, it is advantageous and highly desirable to sort the beer cartons into separate conveyor streams, each containing only one size of carton. Such conveyor streams may be utilized to introduce the carton directly to the automated machinery referred to above and no costly adjustment or modification to presently used machinery would therefore be necessary.

It is an object of the present invention to provide an apparatus or device which will allow a mixture of substantially rectangular articles, such as beer cartons and the like, of various dimensions to be sorted into at least two sets, those having a lateral dimension of a preselected size or above that size and those having a lateral dimension less than the pre-selected size.

STATEMENT OF INVENTION

This object is achieved according to the present invention by providing a device comprising a conveyor for receiving the various sized rectangular articles in a longitudinally aligned condition, the conveyor being adapted to apply a lateral force preferentially to the articles below a pre-selected lateral dimension to urge such articles to a side of the conveyor where they are restrained until allowed to leave, for example via a branch conveyor, the longer articles remaining on the main conveyor. In this way the articles are smoothly and gently sorted into two sets, which sets may be conveniently handled as such or may be further sorted at later stages if desired.

The main conveyor is conveniently a bed of driven cylindrical roller members, set at an angle to the direction of travel of the articles thereon, the angled rollers thus being able to impart the desired lateral force to the articles as well as a longitudinal force necessary to drive the articles longitudinally along the conveyor. Preferably there are two co-planar and parallel beds of roller members, the roller members in each bed being set at substantially the same angle to the direction of travel of the articles so that the two beds form a herringbone pattern or configuration pointing in the direction of travel of the articles.

Alternatively, the conveyor may comprise a bed or beds of roller members of conical form, arranged to have their smallest diameter adjacent the conveyor wall. In a further embodiment the conveyor may comprise one or more series of bands or belts arranged longitudinally parallel to each other and in one plane which forms the conveyor surface. In this embodiment, the desired lateral force is provided by having the belts travel at increasing speeds, the fastest moving belt in the middle of the conveyor and the slowest belt adjacent the conveyor wall. Obviously, the material forming the belts must be relatively robust in nature as one skilled in the art would be fully aware.

Additionally, a powered loop chain may be provided at the side of, and below, the plane of the main conveyor from which the articles are urged by the roller members. The chain loop is provided with pusher means such as upstanding pegs to contact and urge in a longitudinal direction only, the larger sized articles travelling on the conveyor. Preferably, the loop chain moves at a speed which is equal to or greater than that of the main conveyor. In the double bed conveyor embodiment according to the invention, where the two beds are laterally separated, the chain loop may conveniently be located therebetween.

DESCRIPTION OF PREFERRED EMBODIMENTS

The present invention will be further described with reference to and as illustrated in the accompanying drawings but is not to be considered as limited thereto, the scope of the present invention being delineated by the appendant claims. In the drawings:

FIG. 1 is a plan view of a device according to the present invention having a conveyor formed from one bed of angled roller members which terminates at a two-way branching unit, only representative roller and chain loop members being shown;

FIG. 2 is a plan view of a further device of the present invention having a conveyor formed from two beds of angled roller members maintained in a herringbone configuration, the conveyor terminating in a three-way branching unit, serving a main and two subsidiary conveyor passage ways; again only representative roller and chain loop members are specifically illustrated. This figure also includes a container orienting device for supplying correctly aligned cartons to the sorting device;

FIG. 3 is a plan view of a device according to the present invention having a conveyor formed of two beds of angled roller members maintained in a herringbone configuration, which conveyor terminates in a three-way branching unit serving one mainstream conveyor passageway and two subsidiary conveyor passageways which themselves each terminate at a two-way branching unit;

FIG. 4A is a cross-sectional view of a conical roller member of which the conveyor may be included in the device according to the present invention;

FIG. 4B is a plan view of part of a belt conveyor which may be included in a device according to the present invention;

FIG. 5 is a perspective view of several links of a loop chain with article pusher member as may be included in the device of the present invention.

Figure 1:
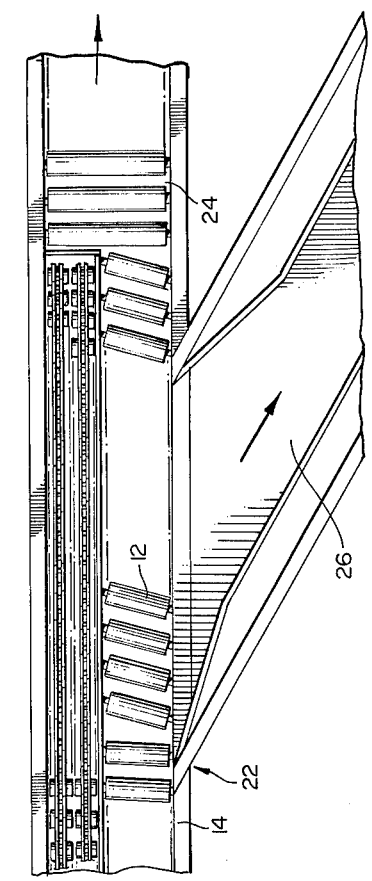
Figure 1:
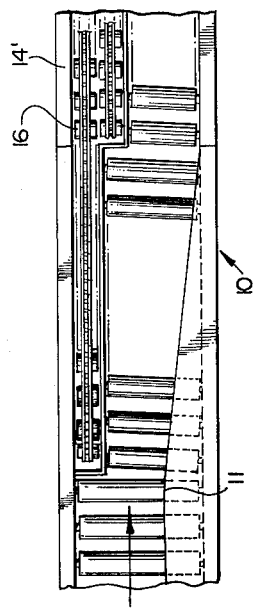

Referring to the drawings and FIG. 1 in particular, there is illustrated a main conveyor 10 formed of a plurality of driven angled roller members 12. In order to assist exit of the smaller cartons from conveyor 10, the roller members 12 adjacent the entrance to subsidiary conveyor 26 may be inclined at a greater angle to the longitudinal direction of the conveyor than the corresponding upstream roller members. In this way, an increased lateral force is applied to the cartons as they arrive at the entrance to subsidiary conveyor 26 urging their clean and rapid exit from the main conveyor 10. A carton retaining sidewall 14 is located to one side of conveyor 10 and a chain loops 16 adjacent the other side 14'. The chain loop is located below the plane of the conveyor 10 but is provided with pusher means 15 (see FIG. 5) in the form of rubber grommets which extend a short distance (about 0.25-0.5 in.) above the upper surface of the conveyor and are arranged to contact only a full-size carton travelling on the conveyor 10. The grommets are carried on extended pins 19 which replace the standard length pins in an otherwise normal chain loop. The speed of rotation of the chain loop is at least as fast as the speed of the advancing cartons on the conveyor 10. The conveyor 10 is supplied with cartons by further conveyor 11, which cartons are already substantially longitudinally orientated before reaching conveyor 10.

Although the conveyor system shown in FIG. 1 has two chain loops 16 this is not really necessary; a single loop would suffice. The two loops are included to render the device more flexible, for example, in its ability to be converted into a two-exit system similar to that described below with reference to FIG. 2.

Figure 2:
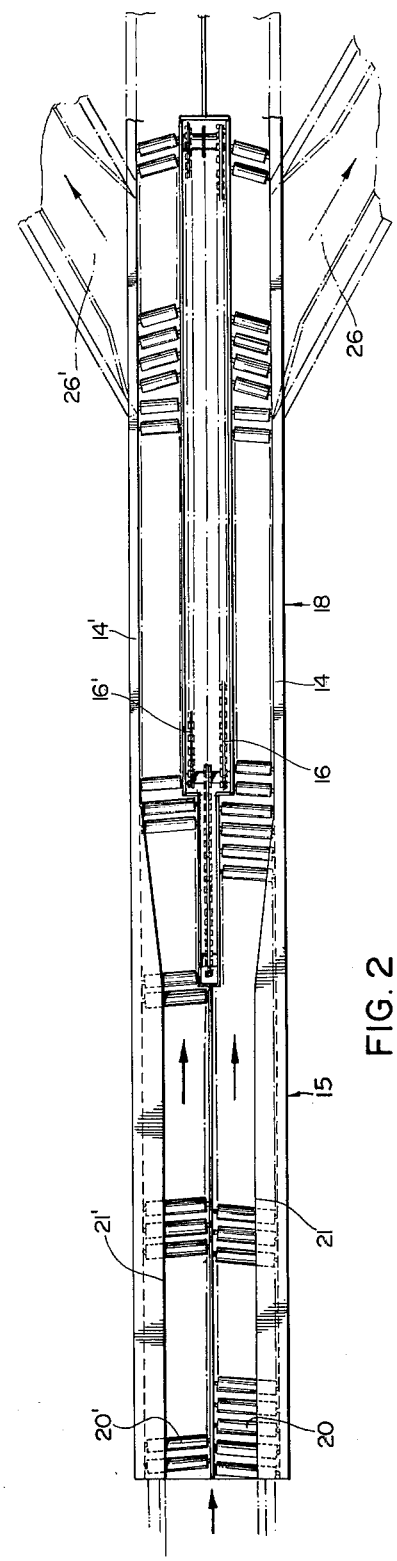

Turning to FIG. 2, this device is essentially a double version of the device shown in FIG. 1. As such, parts common to both embodiments are given the same numbers. The device has a main conveyor 18 having two beds of roller members 12 angled as in the conveyor 10 of FIG. 1 so as to form a herringbone pattern. The main conveyor terminates in a three-way branching unit and each roller bed has, adjacent an outer edge thereof a subsidiary conveyor 26. Adjacent the inner edge of each bed is an associated chain loop 16, the actual construction of which is shown in detail in FIG. 5. As will be described later, this device functions in a like manner to that of FIG. 1 but smaller size cartons are allowed to exit from both sides of the main conveyor resulting in increased through-put capabilities. Also illustrated in FIG. 2 is a carton orienting device 15 which serves the main conveyor 18 and comprises two coplaner beds 20 and 20' of driven angled roller members in a herringbone configuration. Article restraining side walls 21 and 21' are provided on the laterally outer side of each of beds 20 and 20', sidewalls 21 and 21' connecting with sidewalls 14 extending along the full length of conveyor 18. The downstream portion of the orienting device is provided with a chain loop 16' between the roller beds 20. In this portion, the sidewalls 21 commence to diverge until these join with main conveyor sidewalls 14. The loop chain 16' positivly urges each container, which has been roughly aligned on passage through the orienting device, to a side of the main sorting conveyor 18. The chain loop 16' has the construction given in detail in FIG. 5. The conveyor 10 terminates in a two-way branching unit generally designated 22 which leads to a mainstream conveyor 24 colinear with conveyor 10 and a subsidiary conveyor 26 smoothly angled away from the longitudinal line of conveyors 10 and 24. It will be seen that the sidewall 14 follows the course of subsidiary conveyor 26 thereby allowing access thereto for cartons directed from conveyor 10 by the angled rollers 12.

Turning to FIG. 3, there is illustrated in diagrammatic form a further device according to the present invention and, as will be obvious from the succeeding description, the front end of this apparatus is of the same construction as the device of FIG. 2 above. This device has a main conveyor 30 formed by a pair of co-planer, parallel and laterally spaced beds 32 and 32' of driven angled roller members; the roller members of each set being set at substantially the same angle to the direction of carton travel and the two beds thereby forming a herringbone configuration as shown. Located between and below the plane of beds 32 and 32' is a driven chain loop 40 which is provided with grommets 17—ref. FIG. 5. The conveyor 30 is served by a carton orienting device 34 comprised of two coplaner beds 36 and 36' of roller members angled to the direction of carton travel in the same manner as the beds of conveyor 30. The orienting device 34 and conveyor 30 are connected via an intermediate diverging connector portion 38.

Each laterally outermost side of the beds 32, 36, 38 and 32', 36' and 38' are provided with a carton restraining sidewall 33 and 33' respectively. These sidewalls extend along the device 34 and conveyor 30 until they smoothly diverge from the line of the main conveyor 30 at 35 and 35' to allow entrance to subsidiary conveyors 46 and 46' as is explained more fully below. The conveyor 30 terminates at a three-way branching unit 42 which leads to a mainstream conveyor 44, which is co-linear with conveyor 30, and two subsidiary conveyors 46 and 46', which may be provided with carton accelerator sections 48 and 48' respectively. Each subsidiary conveyor 46 and 46' terminates at a further and two-way branching unit 50 and 50' respectively. Each branching unit has its own mainstream conveyor 52 and 52' co-linear with subsidiary conveyor 46 and 46' respectively, and subsidiary conveyor 54 and 54' respectively. To assist in the smooth passage of cartons through the branching unit 42, the corners 47 and 47' on the sidewall between the mainstream conveyor 44 and the subsidiary conveyors 46 and 46' respectively, are bevelled.

Each two-way branching unit 50 and 50' is provided with a pivotably mounted gate 56 and 56' respectively; gate 56 being shown in an operative position closing an entrance to mainstream conveyor 52, and gate 56' being shown in the normal or inoperative position flush with sidewall 33' allowing free entrance into mainstream conveyor 52'. Also located at each two-way branching unit 50 and 50' are two pairs of photocells 58 and 60 and 58' and 60' respectively which constitute carton sensing devices and control the activity of pistons 57 and 57' which operate the gates 56 and 56'.

In the above description, the standard framework, drive means etc. have been omitted since these will be obvious to one skilled in the art. For example, the roller conveyors are generally those known in the art as 37 live roller" conveyors wherein the rollers are driven by a belt maintained in contact with the lower surface of the rollers and travelling in the opposite direction to the travelling cartons. The chain loop is driven by a toothwheel which is rotated by a V-belt. The various drive belts are driven by electric motors located in the conveyor support framework.

The mode of operation of the device of the present invention will be described with specific reference to the embodiment illustrated in FIG. 3 which utilizes a main conveyor 30 formed of two beds of driven angled roller members. The embodiments illustrated in FIGS. 1 and 2 operate in an analogous manner.

Turning to the embodiment shown in FIG. 3, a random sized selection of full-size cartons designated A, half-size cartons designated B, and quarter-size cartons designated C, arrive via a conveyor belt 11 at the carton orientating device 34 from an unloading station (not shown). Under the influence of the forces applied by the driven angled roller members in beds 36 and 36', the cartons line up longitudinally on either or both if full-size of beds 36 or 36' as shown prior to their being transferred via connector conveyor 38 to the main conveyor 30. On arriving at conveyor 30 cartons B and C are urged against the sidewall 33 or 33' of bed 32 or 32' which sidewalls they hug as they travel along the conveyor. This also applies to full-size carton A but to a lesser extent. It should be noted that, in the preferred embodiment shown, the dimension of the roller members forming beds 32 and 32' is chosen so that carton A overlaps both beds 32 and 32'; thus for example part of the lateral force tending to urge a carton A against sidewall 33 is counteracted by an opposite force exerted by the roller members of bed 32'. Additionally, the pusher members of chain loop 40 exert a force only on cartons A and only in the longitudinal direction. This, of course, still occurs when the main conveyor has only one bed as in the embodiment of FIG. 1. The net result of the applied forces is that the full-size cartons A are not directed into a subsidiary conveyor 26 or 26' at the branching unit 42 even though the restraint provided by side walls 33 and 33' is removed; they simply continue along the same general path down the mainstream conveyor 44. On the other hand, the half and quarter-size cartons B and C acted upon by only one bed of roller members are urged and directed off conveyor 30 into a subsidiary conveyor 46 and 46' as soon as the restraint provided by the sidewall 33 and 33' is removed at 35 and 35' respectively, where the sidewalls smoothly curve away from conveyor 30 at the branching unit 42. At this junction therefore the full-size containers have been separated from the half- and quarter-size containers. In some instances separation of the half- and quarter-size cartons may not be necessary.

However, the device shown in FIG. 3 provides for separation of these latter two sizes based on the difference in their longitudinal dimension—the half-size being twice as long as the quarter-size as explained above. The separation will be described mainly with reference only to one (the lowermost) limb of the device as shown in FIG. 2; carton separation in the upper limb being effected in a similar manner. The cartons B and C enter conveyor 46 in a longitudinally aligned condition. Their longitudinal separation may not be sufficient for the next separation step to be undertaken satisfactorily however, and to provide for this eventuality, the conveyor 46 may be provided with an accelerator section 48 which increases the spacing between successive cartons. The cartons therefore arrive singly at the two-way branching unit 50. Located at this unit are two aligned pairs of photocells 58 and 60, which pairs are longitudinally spaced along the conveyor. The distance between the units may be adjusted at will and in the present case is selected so that a quarter-size carton C may interrupt the signal path of only one pair of the photocells at any one time, i.e. a carton C is not long enough to interrupt the beam from both pairs of photocells 58 and 60 simultaneously. In such cases the gate 56 is not activated and a carton C passes through unimpeded on the mainstream conveyor 46 on which it is travelling to further mainstream conveyor 52. However, as a half-size carton B arrives at the branching unit 50, it interrupts both photocell signal beams simultaneously resulting in the said photocells activating piston 57 to swing the gate 56 so as to block the entrance to subsequent mainstream conveyor 52. The gate 56 then effectively forms part of the sidewall 35 which guides a B carton onto subsidiary conveyor 54. When the B carton which activated the carton deflector mechanism has passed through, the gate 56 returns to its passive condition flush with sidewall 33 (refer gate 56') under a pre-set return mechanism (not shown) and the branch unit 50 is ready to receive the next carton.

The photocell sensor arrangement may be replaced by other suitable sensor means which may differentiate the cartons to be sorted on length differences as above or on one or more physical difference, for example, weight differences.

Additionally, the deflector gate 56 may be replaced by alternative deflector means or arrangements, such as an air jet, etc.

The net result of the two separation stages utilized in this embodiment of the present invention is that separation of the three sizes of beer cartons is effected rapidly and smoothly and further, the separated cartons are provided on conveyors carrying cartons of only one size which may therefore be led, for example, directly to automatic machinery as described above or to storage.

As an alternative to the cylindrical roller conveyor described above the conveyor included in the device of the present invention may be made up of a series of parallelly located conical members of the type shown in FIG. 4A; these being located laterally, i.e., at right angles to the longitudinal axis of the conveyor and parallel to each other. The speed of any point on the roller surface is dependant on the diameter, the portions located at higher diameters moving more rapidly than those at lower diameters. In this way, the desired lateral force is exerted on an article riding on a conveyor surface formed of such roller members.

A further alternative is the conveyor illustrated in FIG. 4B. This conveyor comprises (four) bands or belts 70, 72, 74 and 76 located in one plane which forms the conveyor surface and parallel to each other, the speed of the belts decreasing from belt 76 in the middle portion of the coveyor to belt 70 adjacent the sidewall 78. The conveyor may include a loop chain 80, as in the previous embodiments and the conveyor surface formed by belts 70 to 76 may be duplicated on the other side of loop chain 80. In this embodiment it is the relative speed of the various belts which imparts the desired lateral force to articles travelling on the conveyor.

Additionally, the grommets constituting the larger carton pusher means may be replaced by pegs or the like upstanding from the chain loop. Moreover, the chain loop need not necessarily be made of metal or of individual links. For example, a rubber belt or continuous wire provided with suitable carton pusher means may be needed and the term "chain" throughout this specification includes such alternatives.

It will be appreciated that although the present invention has been described in detail in its application to the problem of sorting three selected sizes of beer cartons, it is equally applicable in any instance where it is desired to separate substantially rectangular articles into two sets, i.e. those below a pre-selected width or lateral dimension and those of the pre-selected width and above. Equally several of the devices according to the present invention may, for example, be used in series if necessary, to effect multiple sorting steps based on article width differences, or be combined systems based on alternative differentiating methods such as length (illustrated above) weight, height, etc.

What is claimed is:

1. A device for sorting substantially rectangular articles of various lateral dimensions contained in a single conveyor stream into two separate conveyor streams, one stream containing articles having a lateral dimension above a pre-determined value and a second stream having a lateral demension below the pre-determined value, said device comprising conveyor means for supplying the single stream of said articles in a longitudinally aligned condition to a conveyor having an article supporting surface comprising members, which in operation, constantly apply a lateral force to said articles to urge same toward an article restraining means and a powered chain loop at a side of the conveyor remote from the article restraining means from which it is spaced more than said pre-determined value but less than the width of the larger articles, means on said loop being provided to contact and impart to an article travelling on said conveyor when said article has a lateral dimension greater than said pre-selected size a force only in the longitudinal direction of travel of said article, said conveyor having an article discharge end terminating at a branching unit having a mainstream conveyor passage colinear with said conveyor and a subsidiary conveyor passage angled away from the conveyor side containing said restraining means and into which subsidiary conveyor articles having a lateral dimension below said pre-selected value are projected by said article supporting surface whilst articles having a lateral dimension above said pre-selected value are urged by said chain loop past said subsidiary conveyor to continue along said main conveyor.

2. A device according to claim 1 wherein the article supporting surface is formed of a bed of driven cylindrical roller members each set at an angle to the longitudinal direction of travel of the articles.

3. A device according to claim 2 wherein the roller members in the region of the subsidiary passage are set at a greater angle to the direction of travel of the articles than the remaining roller members so as to provide a relatively greater lateral force to travelling articles at least adjacent an entrance to the subsidiary conveyor passage.

4. A device for sorting substantially rectangular articles of various lateral dimensions contained in a single conveyor stream into two separate conveyor streams, one stream containing large articles having a lateral dimension above a pre-determined value and a second stream containing small articles having a lateral dimension below said pre-determined value, said device comprising conveyor means for supplying said single stream of articles in a longitudinally aligned condition to a conveyor having an article supporting surface formed of a bed of driven cylindrical roller members, each set at an angle to the longitudinal direction of travel of the articles so as to have adjacent leading and trailing roller edges and which members, in operation, constantly impart a lateral force to said articles to urge same toward article restraining means provided at a side of the conveyor defined by said roller trailing edges and a powered chain loop located at a side of the conveyor defined by said roller leading edges which loop is spaced from said article restraining means by more than the said pre-selected value but less than the width of the large articles, said chain loop provided with carrying means to contact and selectively impart to large articles when travelling on said conveyor, a force only in the longitudinal direction of travel of said articles, said conveyor having an article discharge end terminating at branching unit having a mainstream conveyor passage colinear with said conveyor and a subsidiary conveyor passage angled away from the conveyor side containing said restraining means and into which subsidiary conveyor small articles are projected by said article supporting surface whilst large articles are urged by said chain loop past said subsidiary conveyor to continue along said main conveyor.

5. A device according to claim 4, wherein the roller members in the region of the subsidiary conveyor passage are set at a greater angle to the direction of travel of the articles than the remaining roller members so as to provide a relatively greater lateral force to travelling articles at least adjacent an entrance to the subsidiary conveyor passage.

6. A device for sorting substantially rectangular articles of various lateral dimensions contained in a single conveyor stream, of which larger articles have a lateral dimension above a pre-determined value and small articles have a lateral dimension below said pre-determined value , said device comprising conveyor means for supplying said articles in a longitudinally aligned condition to a conveyor having an article supporting surface formed of a pair of parallel coplanar beds of driven cylindrical roller members, the roller members in each bed being set at an angle to the longitudinal direction of travel of the articles to effect a herringbone configuration pointing in the longitudinal direction of travel of the articles so as to have adjacent leading and trailing roller edges and which members, in operation, constantly impart a lateral force to said articles to urge same toward article restraining means provided at a side of each roller bed defined by said roller trailing edges, and a powered chain loop located between and along the length of the roller beds, which loop is from said article restraining means by more than the pre-determined value but less than the lateral dimension of said large articles and is provided with carrying means to contact and selectively impart to said large articles when travelling on said conveyor bed, a force only in the longitudinal direction of travel of said articles, said conveyor having an article discharge end terminating at a branching unit having a mainstream conveyor passage colinear with said conveyor and two subsidiary conveyor passages, one angled away from each conveyor side and into which subsidiary conveyors said small particles are projected by said article supporting surface whilst said large articles are urged by said chain loop past said subsidiary conveyors to continue along said main conveyor.

7. A device according to claim 6, wherein the roller members in the region of the subsidiary conveyor passage are set at a greater angle to the direction of travel of the articles than the remaining roller members so as to provide a relatively greater lateral force to travelling articles at least adjacent an entrance to the subsidiary conveyor passage.

* * * * *